United States Patent
Haberkamp et al.

(10) Patent No.: US 9,415,668 B2
(45) Date of Patent: Aug. 16, 2016

(54) COMPOSITE SOFT TOP ASSEMBLY FOR SUV, BOTH 2 AND 4 DOOR

(71) Applicants: William H. Haberkamp, Rochester Hills, MI (US); George Stickles, Brighton, CO (US)

(72) Inventors: William H. Haberkamp, Rochester Hills, MI (US); George Stickles, Brighton, CO (US)

(73) Assignee: Bestop, Inc., Louisville, CO (US)

( * ) Notice: Subject to any disclaimer, the term of this patent is extended or adjusted under 35 U.S.C. 154(b) by 16 days.

(21) Appl. No.: 14/605,339

(22) Filed: Jan. 26, 2015

(65) Prior Publication Data
US 2015/0130213 A1    May 14, 2015

Related U.S. Application Data

(62) Division of application No. 14/079,881, filed on Nov. 14, 2013, now Pat. No. 8,973,970.

(60) Provisional application No. 61/727,315, filed on Nov. 16, 2012.

(51) Int. Cl.
| | | |
|---|---|---|
| B60R 13/07 | (2006.01) |
| B60J 7/12 | (2006.01) |
| B60J 7/185 | (2006.01) |
| B60J 1/00 | (2006.01) |
| B60J 1/08 | (2006.01) |
| B60J 5/10 | (2006.01) |

(52) U.S. Cl.
CPC ...... *B60J 7/123* (2013.01); *B60J 1/007* (2013.01); *B60J 1/085* (2013.01); *B60J 5/101* (2013.01); *B60J 5/105* (2013.01); *B60J 7/1226* (2013.01); *B60J 7/1858* (2013.01)

(58) Field of Classification Search
CPC ........... H01L 2224/73265; H01L 2224/32225; H01L 2224/48227; H01L 2224/97; B60J 7/1226; B60J 1/1815; B29C 65/00; B29C 66/1122; B29C 66/1142; B29C 66/303
USPC ............. 296/107.09, 107.01, 107.07, 107.15, 296/121, 146.14, 210
See application file for complete search history.

(56) References Cited

U.S. PATENT DOCUMENTS

| | | | | |
|---|---|---|---|---|
| 5,803,529 A * | 9/1998 | Perry-Bores | ............... | B60J 7/10 296/107.09 |
| 5,992,917 A * | 11/1999 | Hilliard | .................. | B60J 1/1815 296/103 |
| 6,036,256 A * | 3/2000 | Hilliard | ....................... | B60J 1/08 160/182 |
| 6,386,617 B1 * | 5/2002 | Kusuma | ................... | B60J 1/085 296/146.15 |
| 6,409,248 B1 * | 6/2002 | Bores | ..................... | B60J 7/1265 296/107.07 |
| 6,439,646 B1 * | 8/2002 | Cornelius | ................ | B60J 7/102 224/309 |
| 6,588,824 B2 * | 7/2003 | Neubrand | ................ | B60J 7/108 296/105 |
| 6,712,420 B1 * | 3/2004 | Kargilis | ................. | B60J 1/1815 219/203 |
| 6,827,391 B1 * | 12/2004 | Kohn | ......................... | B60J 7/10 160/327 |

(Continued)

*Primary Examiner* — Kiran B Patel
(74) *Attorney, Agent, or Firm* — Warn Partners, P.C.

(57) ABSTRACT

A composite soft top assembly having a convertible roof portion that provides an open air feel with a soft, flexible outer layer. The composite soft top assembly further includes soft sides with hard glass or hard polymer materials connected to a frame, which is connected to the soft sides of the assembly. Additionally, the rear window has a removable horseshoe frame structure about which the hard rear window is connected with hinges to allow for the rear window to pivot about at least one hinge between an open and closed position. Additionally, the rear window can have a wiper or electronic wire mounts for a center high mount stop lamp. Additionally, the horseshoe frame structure allows for the connection of other electrical components such as a rear defrost system.

9 Claims, 8 Drawing Sheets

(56) References Cited

U.S. PATENT DOCUMENTS

| | | | | |
|---|---|---|---|---|
| 6,851,739 B2* | 2/2005 | Morley | ........................ | B60J 1/08 280/756 |
| 6,866,322 B2* | 3/2005 | Willard | .................. | B60J 1/1815 296/107.01 |
| 7,523,977 B2* | 4/2009 | Fallis, III | ............... | B60J 7/0053 296/107.09 |
| 7,819,461 B2* | 10/2010 | Loetter | .................... | B60J 7/145 296/107.15 |
| 2002/0079718 A1* | 6/2002 | Neubrand | ................ | B60J 7/061 296/99.1 |
| 2005/0001446 A1* | 1/2005 | Morley | ........................ | B60J 1/08 296/102 |
| 2005/0133169 A1* | 6/2005 | Stahl | ........................ | B60J 1/12 160/87 |
| 2005/0280290 A1* | 12/2005 | Urban | ........................ | B60J 1/14 296/219 |
| 2006/0119131 A1* | 6/2006 | Fallis, III | .................. | B60J 7/10 296/107.09 |
| 2007/0039256 A1* | 2/2007 | Stahl | ........................ | B60J 1/12 52/208 |
| 2007/0114818 A1* | 5/2007 | Reitzloff | .................... | B60J 1/14 296/219 |
| 2007/0257521 A1* | 11/2007 | Fallis, III | ............... | B60J 7/0053 296/218 |
| 2009/0091155 A1* | 4/2009 | Rawlings | ................ | B60J 1/183 296/107.07 |
| 2011/0233959 A1* | 9/2011 | Cover | ........................ | B60J 7/10 296/107.09 |
| 2012/0032472 A1* | 2/2012 | Kitayama | .............. | B60J 1/1869 296/146.8 |
| 2012/0032474 A1* | 2/2012 | Kitayama | .............. | B60J 1/1869 296/180.1 |
| 2014/0284959 A1* | 9/2014 | Hanson | ....................... | B60J 7/10 296/107.07 |
| 2014/0300143 A1* | 10/2014 | Haberkamp | ........... | B60J 7/1291 296/219 |

\* cited by examiner

COMPOSITE SOFT TOP ASSEMBLY FOR SUV, BOTH 2 AND 4 DOOR

CROSS-REFERENCE TO RELATED APPLICATIONS

This application is a divisional application of U.S. patent application Ser. No. 14/079,881, filed Nov. 14, 2013 which claims the benefit of U.S. Provisional Application No. 61/727,315, filed Nov. 16, 2012.

FIELD OF THE INVENTION

The present invention relates to a composite soft top assembly having a convertible roof, hard windows and a removable horseshoe rear lift gate.

BACKGROUND OF THE INVENTION

Convertible roof tops are commonly used in sport-utility vehicles for recreational purposes. The foldable roof can typically be moved between an open position, and a deployed position. When in the deployed position, the foldable roof will protect the occupants of the vehicle from various weather conditions. However, there are occasions where the weather is pleasant, and it is desired by the occupants of the vehicle to move the foldable roof to an open position such that the vehicle essentially functions without a roof, and the passenger compartment of the vehicle is exposed to the atmosphere. This allows the occupants of the vehicle to enjoy more favorable weather conditions while driving.

Many different convertible roofs also incorporate removable windows which are attached to the roof through the use of various zippers and retainers. However, vehicles incorporating a convertible roof are often driven throughout the entire year, and the convertible roof remains in the deployed position during the winter months. Current removable windows are made of a soft, flexible substrate, such as flexible PVC (Polyvinyl Chloride) or TPU (Thermoplastic Polyurethanes) materials, which are not easily cleaned during the wintertime without damaging the soft window material. Additionally, the soft windows scratch easily and cannot be used in a carwash. Also, often times the soft rear window material can be difficult to move out of the way for rear access to the vehicle.

An alternative to the convertible soft top is to use a hard top that is bulky and does not provide any open air feel without removing the entire top. If the entire hard top is removed, it then must be stored, which is often difficult because of the size of the top. It is desirable to design a composite top made of soft material with hard windows and a more manageable and removable rear window. It is also desirable to provide a top that can be opened to provide what is often referred to as an open air feel, where a portion of the top of the roof is moved from a closed position to an open position exposing a portion of the inside vehicle compartment to the outside.

SUMMARY OF THE INVENTION

The present invention is directed to a composite soft top assembly having a convertible roof portion that provides an open air feel with a soft, flexible outer layer. The composite soft top assembly further includes soft sides or quarter side windows with hard glass or hard polymer materials connected to a frame, which is connected to the soft sides of the assembly. Additionally, the rear window has a removable horseshoe frame structure about which the hard rear window is connected with hinges to allow for the rear window to pivot about at least one hinge between an open and closed position. The rear window can have a window wiper, electronic wire mounts for a center high mount stop lamp, or other electrical components such as a rear window defrost system.

Further areas of applicability of the present invention will become apparent from the detailed description and Appendix provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Referring now generally to all of the figures with particular reference to FIGS. 1-12, a composite soft top assembly 10 connected to a vehicle 11. The composite soft top assembly 10 includes a rigid rear window horseshoe 12 that is connected to the vehicle 11 and extends upward and is connected to a support or roll over frame of the vehicle. The rigid rear window horseshoe 12 includes a frame portion 14 made of polymer or metal and a rear window 16 that in one embodiment is pivotally connected to the frame 14 to provide a lift gate feature. Optionally, the rear window 16 is permanently connected to the frame without any type of pivot. The composite soft top assembly 10 also includes a front edge frame rail 18 that in one embodiment is capable of pivoting to move the composite soft top assembly between the deployed and open position in order to provide the open air feel of the composite soft top without completely removing the composite soft top assembly 10 from the vehicle 11.

A soft skin roof top 20 is connected a rear edge 22 to the frame 14 of the rigid rear window horseshoe 12. A front edge 24 of the soft skin roof top 20 is connected to the front edge frame rail 18 so that the soft skin roof top when in the deployed position extends between the rigid rear window horseshoe 12 and front edge frame rail 18. The soft skin roof top 20 is flexible and capable of pivoting and moving with the front edge frame rail 18 when moved from the deployed position to the open position. The soft skin roof top 20 includes two side edges 26 that are connected to at least two side rails 28 extending along the sides of the vehicle 11 so that the at least two side rails 28, front edge frame rail 18 and rigid rear window horseshoe 12 generally form a square or top of the composite soft top roof assembly 10.

While the present embodiment of the invention utilizes at least two side frame rails 28, it is possible to have a greater or lesser number of side frame rails depending upon the structure of the vehicle frame. The at least two side rails 28 are bolted onto the A and B pillars of the vehicle 11. The two side edges 26 have a rigid retainer, which is sometimes referred to as a J-lock retainer 27 formed into the edge of the soft skin roof top 20 for connecting to a flange 29 formed on the at least two side rails 28. The rear edge 22 of the soft skin roof top 20 also has a J-lock retainer for connecting to a flange formed in the frame 14 of the rear window horseshoe 12. The front edge 24 of the soft skin roof top 20 is connected to the front edge frame rail 18 using fasteners; however, it is possible to use adhesives or a J-lock retainer with a flange formed on the front edge frame rail 18 or a C-clamp retainer for locking onto a front edge frame rail 18 that is round in shape. The use of the retainers allows for the soft skin roof top 20 to be connected to the vehicle 11 without the need for a large number of fasteners, adhesives or other permanent mounts. This allows for the easy removal of the front edge frame rail 18 without tools.

Figure 1:
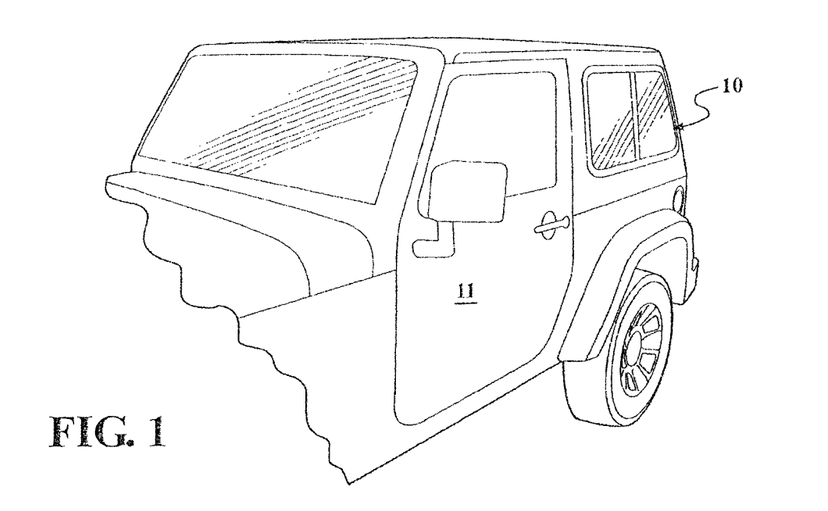
FIG. 1 is a side perspective view of the composite soft top assembly connected to a vehicle.
Figure 2:
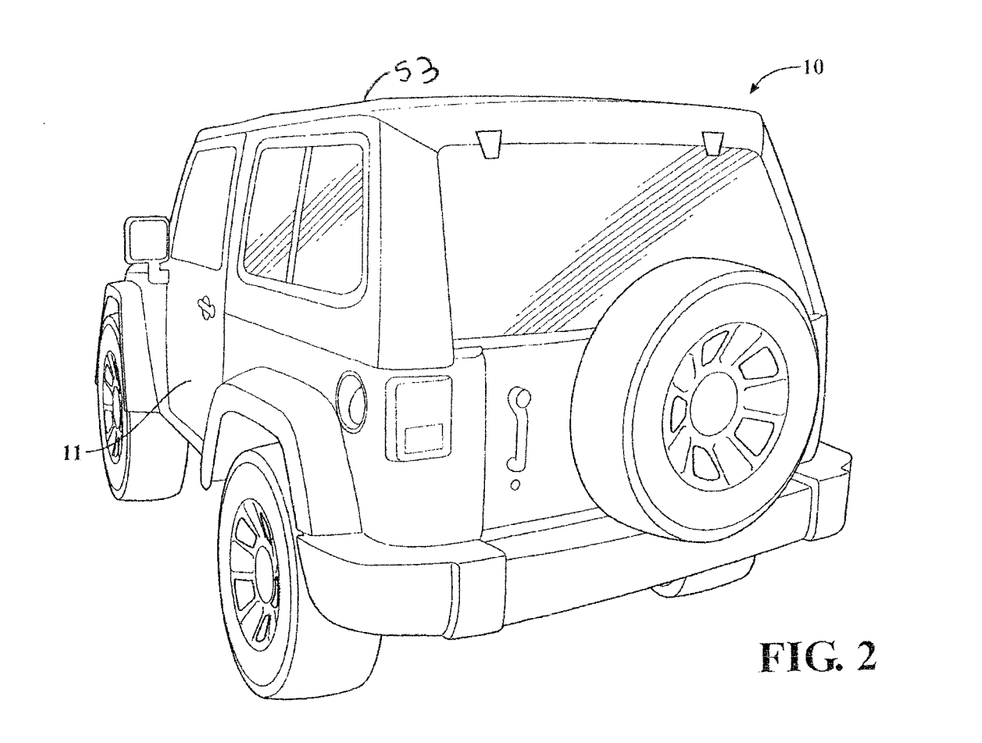
FIG. 2 is a side rear of the composite soft top assembly connected to a vehicle.
Figure 3:
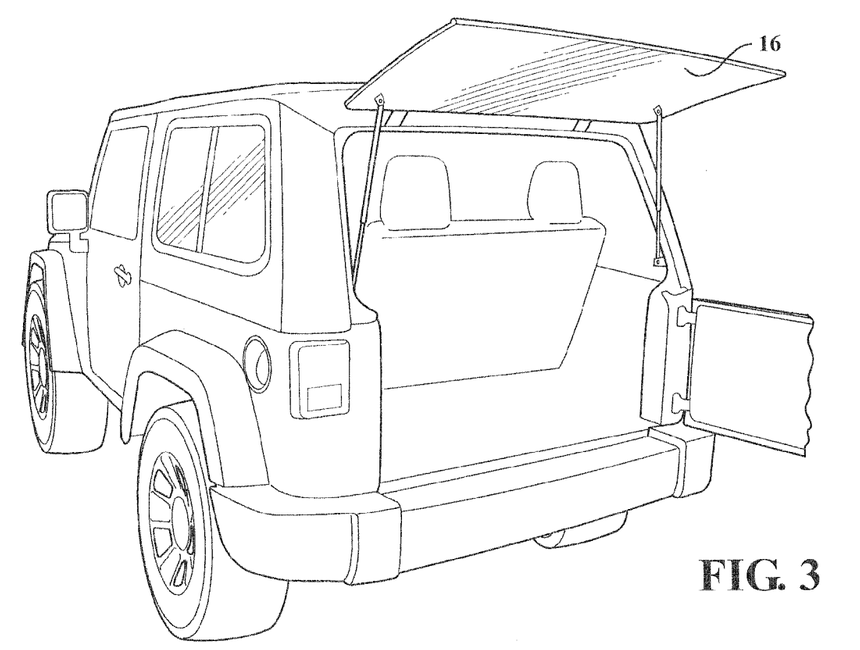
FIG. 3 is a rear perspective view of the composite soft top assembly where the rear window is in the open position.
Figure 4:
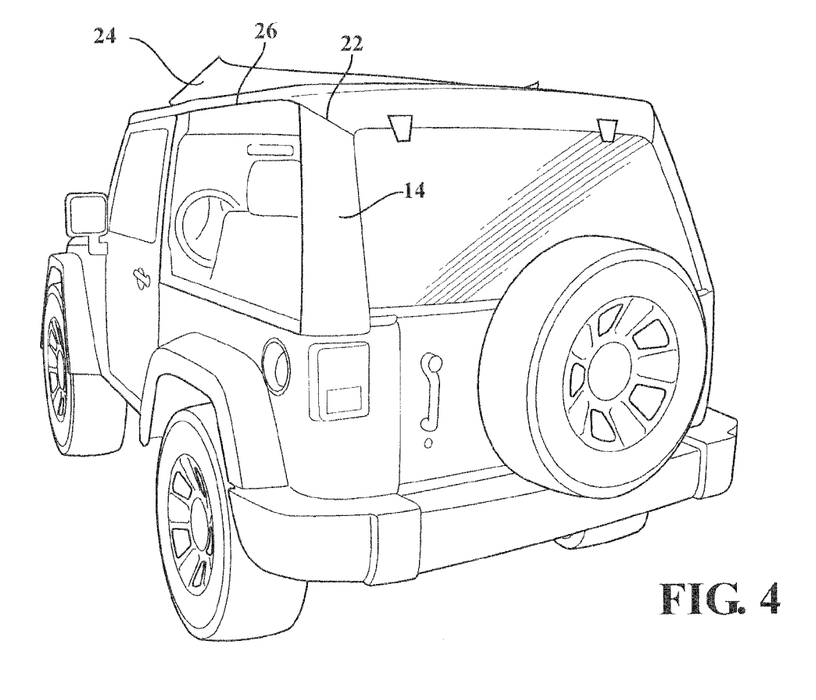
FIG. 4 is rear side perspective view of another aspect of the invention where the rear side windows of the soft top assembly have been removed and the convertible roof top has been opened.
Figure 5:
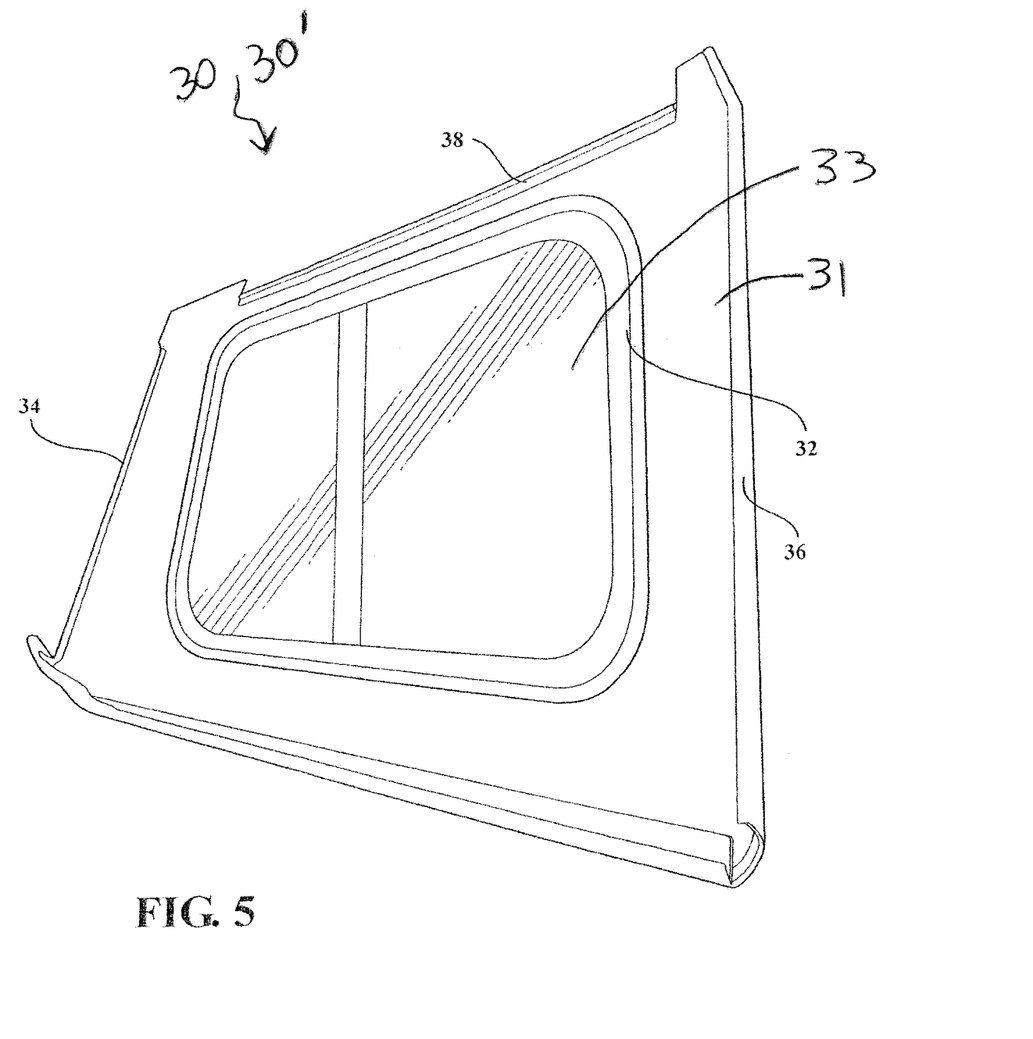
FIG. 5 is a inside side perspective view of the left side rear quarter window of the soft top assembly showing the hard window with frame connected to the soft fabric.
Figure 6:
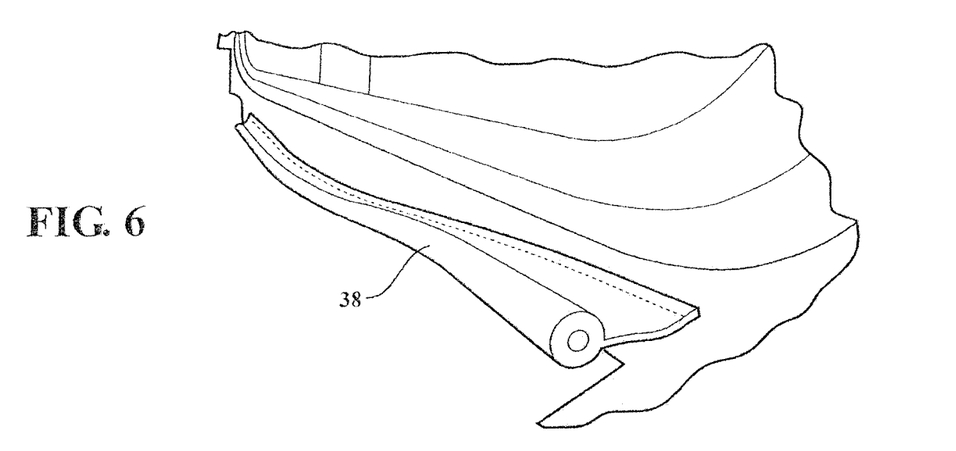
FIG. 6 is a close-up side perspective view of the P-Welt flange formed along the top of the quarter window.
Figure 7:
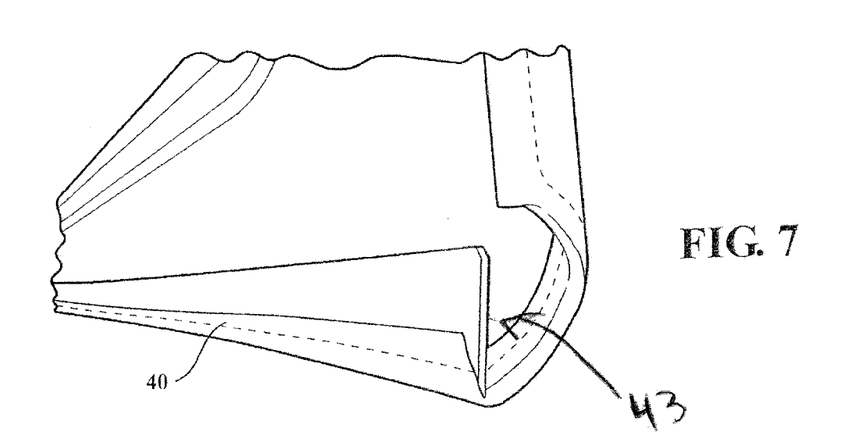
FIG. 7 is an exploded perspective view of the bottom or back edge of the quarter window showing the J-lock retainer used to attach the back and bottom edge of the quarter window to the vehicle.
Figure 8:
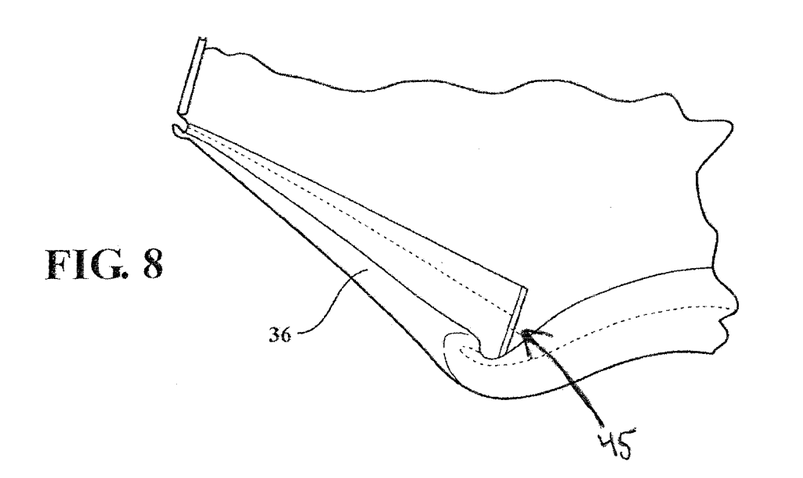
FIG. 8 is an exploded inside perspective view of the front edge of the quarter window of FIG. 5, where the front edge has a retainer flange that connects to the front edge of the window to an edge on the B-pillar of the vehicle.

The composite soft top assembly 10 also includes a left side quarter panel generally shown at 30 and right side quarter panel generally shown at 30', each having a soft skin portion 31 with a hard window 33 connected to a metal frame 32 that is connected to the soft skin of the left side quarter panel 30 and right side quarter panel 30'. While this particular embodiment of the invention shows a single left and right side quarter panels 30, 30', it is within the scope of this invention for multiple side quarter panels to be used in connection with the composite soft top assembly 10. It is also within the scope of this invention for the hard windows 33 and frame 32 to be a soft window or composite windows connected to the soft sides of the left and right side quarter panels 30, 30' without the use of a frame member.

Each of the left and right side quarter panels 30, 30' has a rear edge 34, front edge 36, top edge 38 and bottom edge 40 that are connected to the vehicle 11. The rear edge 34 of the left and right side quarter panels 30, 30' connect to the frame 14 of the rigid rear window horseshoe 12 using a retainer that is configured to lock into a flange on the frame 14. In this particular embodiment of the invention, the left and right side quarter panels 30, 30' wrap around the frame 14 of the rear window horseshoe so that the soft skin of the left and right side rear window quarter panels cover the frame 14 to give a soft skin look to a portion of the frame 14 of the rigid rear window horseshoe 12. The front edge 36 of the left and right side quarter panels 30, 30' have an attachment mechanism generally shown at 45 that is a retainer. The front edge 36 of the left and right side quarter panels 30, 30' connect to a pillar frame having an edge configured to receive the retainer on the front edge 36. The top edge 38 of the left and right side quarter panels 30, 30' are configured to connect to one of the at least two side rails 28 using a retainer. In this particular embodiment of the invention, the retainer used is called a P-Welt that is formed on the top edge 38 and slides into a channel 42 formed on each of the at least two side rails 28. The bottom edge 40 of the left and right side quarter panels 30, 30' have an attachment mechanism generally shown at 43 that is a retainer that slides into a body flange 44 formed along the body of the vehicle 11. The type of retainer shown in this particular embodiment of the invention is called a J-lock retainer. While there are specific types of retainers described, it is within the scope of this invention for other types of retainers or fasteners to be used in connection with all of the edges of the different portions of the composite soft top assembly 10.

Figure 14:
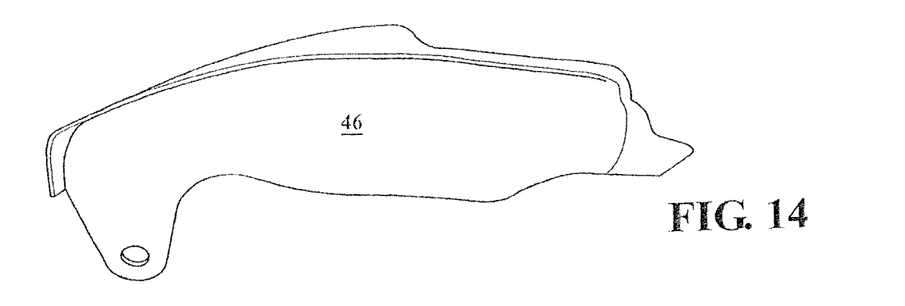
FIG. 14 is a end view of the horseshoe frame aperture foot mount.
Figure 15:
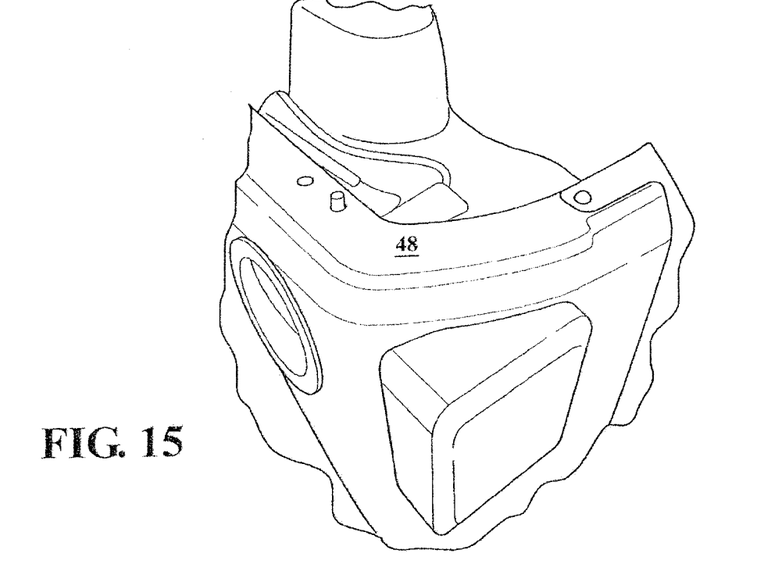
FIG. 15 is a top perspective view of the vehicle body flange receiving portion for the horseshoe foot mount for the rear horseshoe frame.
Figure 16:
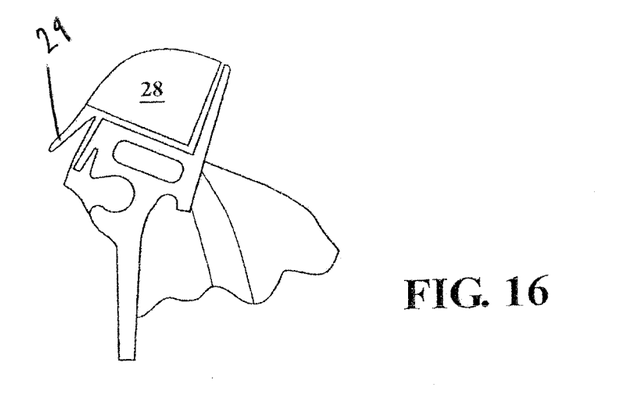
FIG. 16 is a cross-sectional end view of the side rail frame of the composite soft top assembly.
Figures 17A, 17B, 17C:
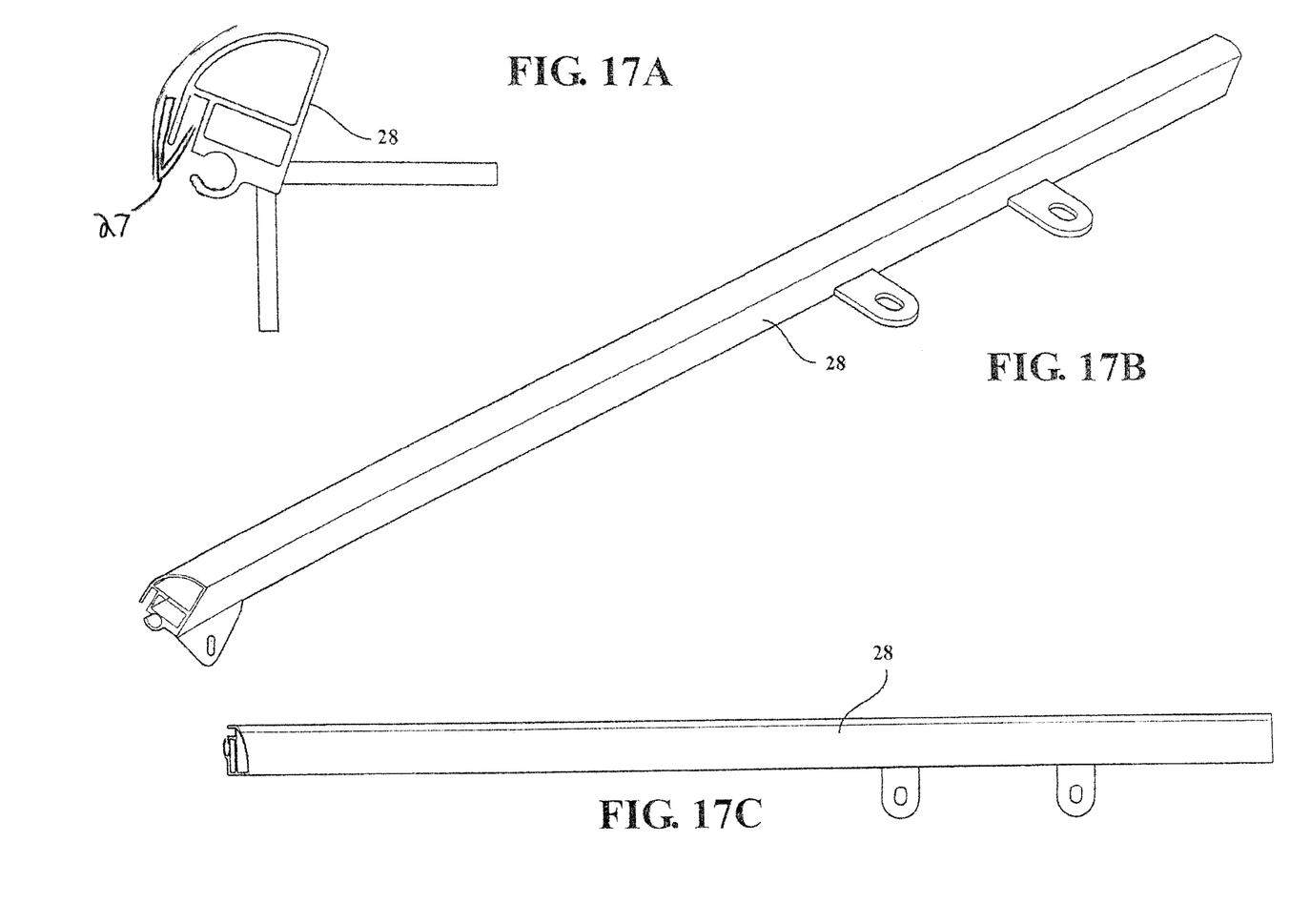
FIG. 17A is a schematic cross-sectional view of one of the side rails of the composite soft top assembly.
FIG. 17B is a side perspective view of one of the side rails of the composite soft top assembly.
FIG. 17C is an overhead plan view of one of the side rails of the composite soft top assembly.

The rigid rear window horseshoe 12 has an aperture foot mount 46 shown in FIG. 14 that is configured to rest on and be bolted onto a rear horseshoe flange 48 formed on the body of the vehicle 11. The bolts shown in FIG. 14 are used to allow for the connection and removal of the rigid rear window horseshoe 12.

Figure 9:
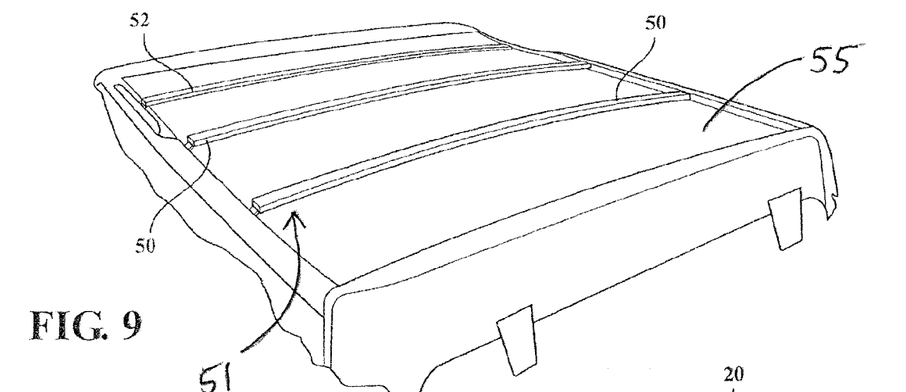
FIG. 9 is a top perspective view of the composite soft top assembly with the roof portion removed and the roof bows shown.
Figures 10, 11:
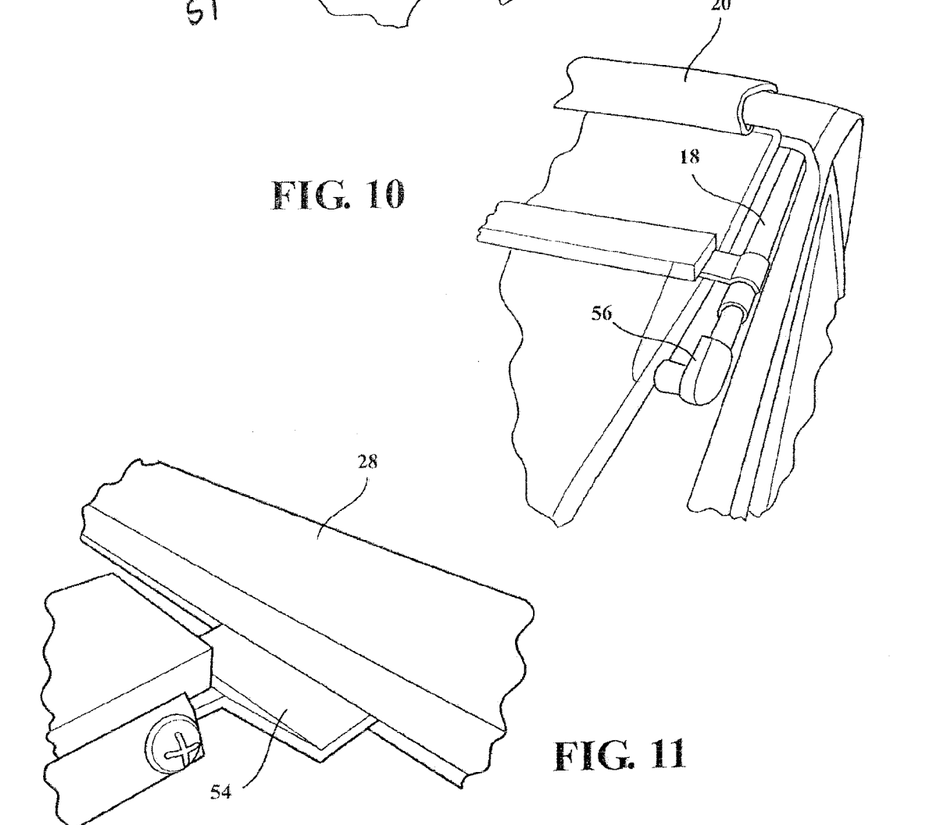
FIG. 10 is an exploded perspective view of the roof of the composite soft top assembly showing the moveable side rail and front support bow for the convertible portion of the composite soft top assembly.
FIG. 11 is a close-up perspective view of the side rails of the soft top roof assembly having a pocket for receiving one of the two rear bows of the composite soft top assembly.
Figure 12:
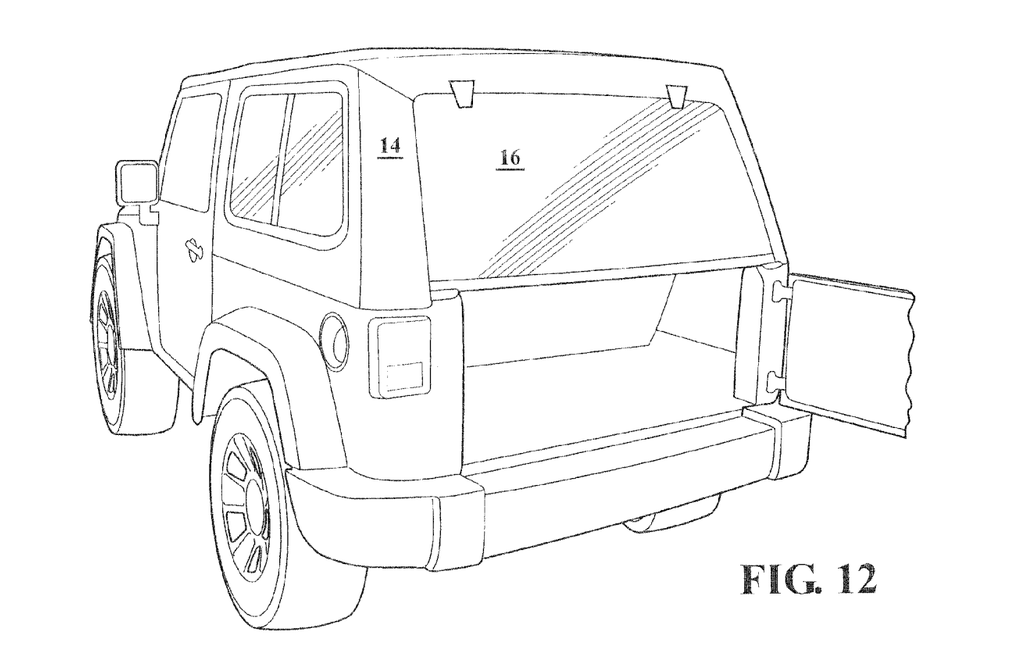
FIG. 12 is a rear perspective view of the horseshoe frame of the rear window of the composite soft top assembly.
Figure 13:
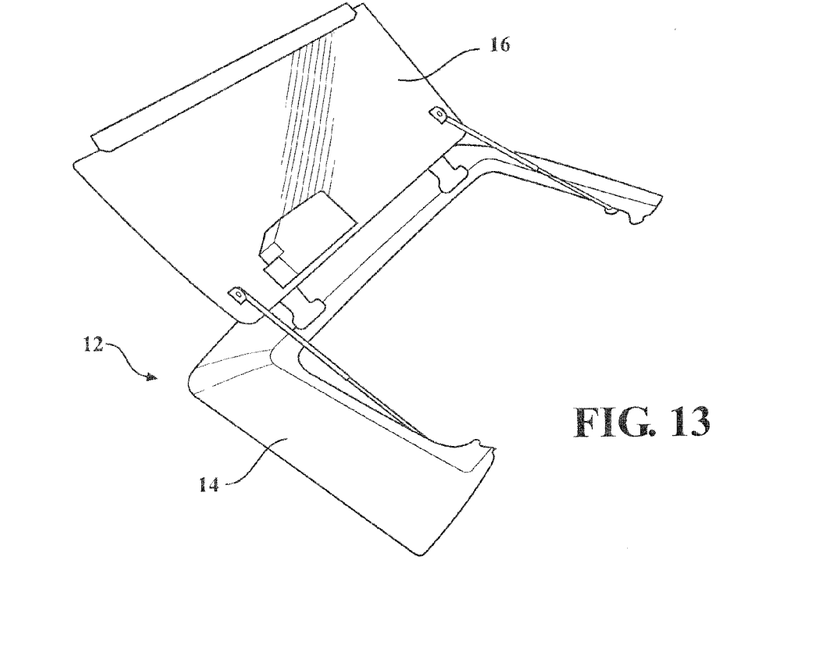
FIG. 13 is a perspective of the horseshoe frame removed from the vehicle.

The soft skin roof top 20 of the composite soft top assembly 10 can be disconnected from the rear edge 22, front edge 24 and two side edges 26 in order to remove the soft skin roof top 20 and expose, underneath an outer layer 53, a second layer generally shown at 51 of the soft top assembly 10, which second layer 51 includes two or more stationary roof bows 50 and a moveable roof bow 52. The stationary roof bows 50 are configured to rest in pockets 54 formed on each of the two side rails 28. The stationary roof bows 50 are removable from the pockets 54. The moveable roof bow 52 is connected with fasteners to side portions of the front edge frame rail 18. The front edge frame rail is pivotally connected by a pivot bracket 56. The pivot bracket 56 is connected to the vehicle 11 and the front edge frame rail 18 is pivotally connected to the pivot bracket 56.

In addition to the stationary roof bows 50 and 54, a layer of foam material 55 is positioned below the stationary roof bows 50 and moveable roof bow 52 between the bows and the vehicle headliner, which forms the inside surface of the interior surface of the roof of the vehicle compartment.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A composite soft top assembly comprising:
   a rigid rear window horseshoe forming a frame portion with a rear window mounted to the frame;
   a front edge frame rail;
   a soft skin roof top connected at a rear edge to said rigid rear window horseshoe and a front edge to said front edge frame rail, wherein the front edge frame rail pivots with a portion of said soft skin roof top between a deployed position and an open position to provide an open air feel of the composite soft top assembly, without completely removing the composite soft top assembly from a vehicle;
   at least two side rails extending between said rigid rear window horseshoe and said front edge frame rail, wherein a respective one of at least two side edges of said soft skin roof top are each connectable to a respective one of said at least two side rails;
   at least one left side quarter panel connectable at a rear edge of the at least one left side quarter panel to said rigid rear window horseshoe and having a soft skin portion, such that a portion of said at least one left side quarter panel wraps around the frame portion of the rigid rear window horseshoe when said rear edge is connected to the frame portion and at a top edge to one of the at least two side rails, wherein a bottom edge and a front edge of said at least one left side quarter panel each has a respective attachment mechanism for connection to said vehicle;
   at least one right side quarter panel connectable at a rear edge of the at least one left side quarter panel to said rigid rear window horseshoe and having a soft skin portion, such that a portion of said at least one right side quarter panel wraps around the frame portion of the rigid rear window horseshoe when said rear edge is connected to the frame portion and at a top edge to one of the at least two side rails, wherein a bottom edge and a front edge of said at least one right side quarter panel each has a respective attachment mechanism for connection to said vehicle; and
   a hard window connected to said soft skin portion on each one of said at least one left side quarter panel and said at least one right side quarter panel.

2. The composite soft top assembly of claim 1, wherein the rear window is pivotally mounted to the frame portion allowing the rear window to pivot between an open position and a closed position.

3. The composite soft top assembly of claim 1, wherein the rear edge of said soft skin roof top wraps around and covers a portion of the frame portion when connected to the frame portion.

4. The composite soft top assembly of claim 1, wherein the at least two side rails are each bolted on to and extend between an A-pillar and a B-pillar of said vehicle.

5. The composite soft top assembly of claim 1, wherein the at least two side edges have a J-lock retainer for connecting to a flange formed on each of the at least two side rails.

6. The composite soft top assembly of claim 1, wherein the front edge of the soft skin roof top has a C-clamp that connects to a rounded portion of the front edge frame rail.

7. The composite soft top assembly of claim 1, wherein the soft skin roof top has a second layer underneath an outer layer, where the second layer has two or more stationary roof bows and a moveable roof bow for supporting the soft skin roof top.

8. The composite soft top assembly of claim 7, further comprising a layer of foam material located below the two or more stationary roof bows and the moveable roof bow.

9. A composite soft top assembly comprising:
   a rigid rear window horseshoe forming a frame portion with a rear window mounted to the frame portion;
   a front edge frame rail;
   a soft skin roof top, wherein the soft skin roof top has a second layer underneath an outer layer, where the second layer has two or more stationary roof bows and a moveable roof bow for supporting the soft skin roof top;
   a layer of foam material located below the two or more stationary roof bows and the moveable roof bow of the second layer;
   at least two side rails extending between said rigid rear window horseshoe and said front edge frame rail, wherein a respective one of two side edges of said soft skin roof top are each connectable to a respective one of said at least two side rails;
   at one left side quarter panel connectable at a rear edge to said rigid rear window horseshoe, such that a portion of said at least one left side quarter panel wraps around the frame portion of the rigid rear window horseshoe when said rear edge is connected to the frame portion and at a top edge to one of at least two side rails, wherein a bottom edge and a front edge of said at least one left side quarter panel each has a respective attachment mechanism for connection to a vehicle;
   at least one right side quarter panel connectable at a rear edge to said rigid rear window horseshoe such that a portion of said at least one right side quarter panel wraps around the frame portion of the rigid rear window horseshoe when said rear edge is connected to the frame portion and at a top edge to one of the at least two side rails, wherein a bottom edge and a front edge of said at least one right side quarter panel each has a respective attachment mechanism for connection to said vehicle; and
   a hard window connected to said soft skin portion on each one of said at least one left side quarter panel and said at least one right side quarter panel.

* * * * *